(12) United States Patent
Osada

(10) Patent No.: US 11,056,718 B2
(45) Date of Patent: Jul. 6, 2021

(54) SULFIDE-BASED SOLID ELECTROLYTE

(71) Applicant: TOYOTA JIDOSHA KABUSHIKI KAISHA, Toyota (JP)

(72) Inventor: Naoki Osada, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/662,675

(22) Filed: Oct. 24, 2019

(65) Prior Publication Data
US 2020/0136179 A1 Apr. 30, 2020

(30) Foreign Application Priority Data
Oct. 29, 2018 (JP) .............................. JP2018-202596

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC .......................... C01B 25/14; H01M 2300/008
See application file for complete search history.

(56) References Cited

U.S. PATENT DOCUMENTS

2009/0159839 A1 6/2009 Seino et al.
2014/0302382 A1* 10/2014 Kambara ............ H01M 10/054
429/162

FOREIGN PATENT DOCUMENTS

JP 2014-032864 A 2/2014
WO 2007/066539 A1 6/2007

* cited by examiner

*Primary Examiner* — Maira Laios
(74) *Attorney, Agent, or Firm* — Sughrue Mion, PLLC

(57) ABSTRACT

Provided is a sulfide-based solid electrolyte with high lithium ion conductivity. The sulfide-based solid electrolyte may be a sulfide-based solid electrolyte, wherein the sulfide-based solid electrolyte comprises a lithium (Li) element, a phosphorus (P) element, a sulfur (S) element and a halogen element, and it has a LGPS-type crystal structure, and wherein a ratio ($P_{4d}/P_{2b}$) between a proportion ($P_{4d}$) of an area of a peak assigned to phosphorus atoms occupying 4d sites in the crystal structure and a proportion ($P_{2b}$) of an area of a peak assigned to phosphorus atoms occupying 2b sites in the crystal structure, both of which are peaks observed in a $^{31}$P-MAS-NMR spectrum of the sulfide-based solid electrolyte, is 1.77 or more and 2.14 or less.

3 Claims, 2 Drawing Sheets

SULFIDE-BASED SOLID ELECTROLYTE

TECHNICAL FIELD

The disclosure relates to a sulfide-based solid electrolyte.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses a method for producing a solid electrolyte by heating a sulfide glass containing Li, P and S at 190° C. to 220° C. for 3 to 240 hours.

Patent Literature 2 discloses a sulfide solid electrolyte material of a composition represented by the following general formula: LiI.(100-y)[(75-x)Li$_2$S.xLi$_2$O.25P$_2$S$_5$)] (wherein x and y represent mol %; x is larger than 0 and less than 6; and y is larger than 0).

Patent Literature 1: International Publication No. WO2007/066539

Patent Literature 2: Japanese Patent Application Laid-Open (JP-A) No. 2014-032864

When, in the production of a sulfide-based solid electrolyte, a heat treatment temperature is increased for the purpose of increasing the crystallinity of the sulfide-based solid electrolyte, once the heat treatment temperature reaches a certain temperature, the crystallinity of the thus-obtained sulfide-based solid electrolyte cannot be increased to a certain value or higher, even if the heat treatment temperature is increased higher than the certain temperature. Then, if the crystallinity of the sulfide-based solid electrolyte is increased, the crystal structure the sulfide-based solid electrolyte is aiming for collapses, and a diploid phase appears. As a result, there is a problem in that the lithium ion conductivity of the sulfide-based solid electrolyte decreases.

SUMMARY

In light of the above circumstances, an object of the disclosed embodiments is to provide a sulfide-based solid electrolyte with high lithium ion conductivity.

In a first embodiment, there is provided a sulfide-based solid electrolyte, wherein the sulfide-based solid electrolyte comprises a lithium (Li) element, a phosphorus (P) element, a sulfur (S) element and a halogen element, and it has a LGPS-type crystal structure, and wherein a ratio ($P_{4d}/P_{2b}$) between a proportion ($P_{4d}$) of an area of a peak assigned to phosphorus atoms occupying 4d sites in the crystal structure and a proportion ($P_{2b}$) of an area of a peak assigned to phosphorus atoms occupying 2b sites in the crystal structure, both of which are peaks observed in a $^{31}$P-MAS-NMR spectrum of the sulfide-based solid electrolyte, is 1.77 or more and 2.14 or less.

The crystallinity of the sulfide-based solid electrolyte may be 70% or more and 82% or less.

According to the disclosed embodiments, the sulfide-based solid electrolyte with high lithium ion conductivity can be provided.

BRIEF DESCRIPTION OF THE DRAWINGS

In the accompanying drawings.

DETAILED DESCRIPTION

Figure 1:
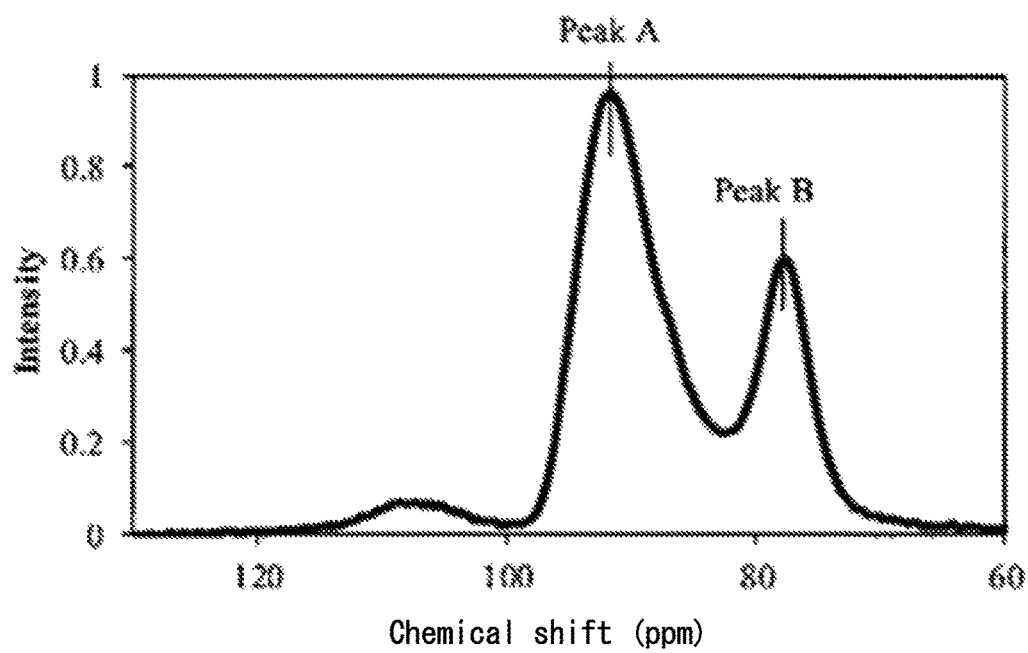
FIG. 1 shows a $^{31}$P-MAS-NMR spectrum of a sulfide-based solid electrolyte which has a LGPS-type crystal structure and which does not contain a germanium element.

The sulfide-based solid electrolyte according to the disclosed embodiments is a sulfide-based solid electrolyte, wherein the sulfide-based solid electrolyte comprises a lithium (Li) element, a phosphorus (P) element, a sulfur (S) element and a halogen element, and it has a LGPS-type crystal structure, and wherein a ratio ($P_{4d}/P_{2b}$) between a proportion ($P_{4d}$) of an area of a peak assigned to phosphorus atoms occupying 4d sites in the crystal structure and a proportion ($P_{2b}$) of an area of a peak assigned to phosphorus atoms occupying 2b sites in the crystal structure, both of which are peaks observed in a $^{31}$P-MAS-NMR spectrum of the sulfide-based solid electrolyte, is 1.77 or more and 2.14 or less.

The disclosed embodiments focused on the crystal structure of the sulfide-based solid electrolyte, instead of the crystallinity of a sulfide-based solid electrolyte. As a result, a crystal structure condition for increasing not only the crystallinity but also the Li ion conductivity, was found.

More specifically, the following was found: by controlling the ratio ($P_{4d}/P_{2b}$) between the proportion ($P_{4d}$) of the area of the peak assigned to the phosphorus atoms occupying the 4d sites in the crystal structure and the proportion ($P_{2b}$) of the area of the peak assigned to the phosphorus atoms occupying the 2b sites in the crystal structure, both of which are peaks observed in the $^{31}$P-MAS-NMR spectrum of the sulfide-based solid electrolyte, to 1.77 or more and 2.14 or less, the Li ion conductivity of the sulfide-based solid electrolyte can be increased without an excessive increase in the crystallinity of the sulfide-based solid electrolyte (e.g., 90% or more).

It is estimated that the $P_{4d}/P_{2b}$ value is varied by replacing each PS$_4$ tetrahedron with each halogen atom in the LGPS-type crystal structure.

According to the disclosed embodiments, it was found that the sulfide-based solid electrolyte for which the $P_{4d}/P_{2b}$ value is in the above range, has higher lithium ion conductivity than the sulfide-based solid electrolyte for which the $P_{4d}/P_{2b}$ value is outside the range.

The LGPS-type crystal structure is a three-dimensional framework structure in which (Ge$_{0.5}$P$_{0.5}$)S$_4$ tetrahedra and LiS$_6$ octahedra share edges and are one-dimensionally aligned to form one-dimensional chains, and each one-dimensional chain is connected to at least one adjacent one-dimensional chain via the $PS_4$ tetrahedra.

As the type of the sites (positions) occupied by the phosphorus atoms in the LGPS-type crystal structure, the following two types are known: the 4d sites composing each one-dimensional chain and the 2b sites positioned at connection points connecting the one-dimensional chains. The 4d sites are known to be occupied by germanium atoms and phosphorus atoms at a ratio of 1:1 (in terms of the number of atoms). The 2b sites are known to be occupied by phosphorus atoms only.

Both the proportion ($P_{4d}$) of the area of the peak assigned to the phosphorus atoms occupying the 4d sites in the crystal structure and the proportion ($P_{2b}$) of the area of the peak assigned to the phosphorus atoms occupying the 2b sites in the crystal structure, can be identified by $^{31}P$ magic angle spinning nuclear magnetic resonance spectroscopy ($^{31}P$-MAS-NMR).

In general, the area of a peak shown in the $^{31}P$-MAS-NMR spectrum reflects the abundance ratio of the phosphorus atoms (a measurement target).

FIG. 1 shows a $^{31}P$-MAS-NMR spectrum of a sulfide-based solid electrolyte which has a LGPS-type crystal structure and which does not contain a germanium element.

Two peaks (peak A and peak B) are shown in FIG. 1. The peak A indicates the peak assigned to the phosphorus atoms occupying the 4d sites in the LGPS-type crystal structure. The peak B indicates the peak assigned to the phosphorus atoms occupying the 2b sites in the LGPS-type crystal structure.

Hereinafter, attention will be focused on the peak A and the peak B. The intensity ratio of the peak A to the peak B is about 2:1. Accordingly, it is clear that the ratio ($P_{4d}$:$P_{2b}$) of the proportion ($P_{4d}$) of the area of the peak assigned to the phosphorus atoms occupying the 4d sites in the crystal structure of the sulfide-based solid electrolyte shown in FIG. 1, to the proportion ($P_{2b}$) of the area of the peak assigned to the phosphorus atoms occupying the 2b sites in the crystal structure thereof, is about 2:1.

Meanwhile, in the case of a substance containing a germanium element and having a general LGPS-type crystal structure, the 4d sites are occupied by germanium atoms and phosphorus atoms at a ratio of 1:1 (in terms of the number of atoms). Accordingly, in the spectrum of the substance obtained by $^{31}P$-MAS-NMR, the intensity ratio of the peak A to the peak B is about 1:1.

However, in the case of the sulfide-based solid electrolyte as shown in FIG. 1, which has the LGPS-type crystal structure and which does not contain a germanium element, the 4d sites in the crystal structure of the sulfide-based solid electrolyte is thought to be occupied by only the phosphorus atoms. Accordingly, the intensity ratio of the peak A to the peak B is theoretically 2:1.

Since the sulfide-based solid electrolyte of the disclosed embodiments contains the halogen element, such a phenomenon is interred to be caused, that the $PS_4$ tetrahedra composed of the phosphorus atoms occupying the 4d sites and/or the $PS_4$ tetrahedra composed of the phosphorus atoms occupying the 2b sites, are replaced by the halogen atoms.

Since the $PS_4$ tetrahedra in the crystal structure of the sulfide-based solid electrolyte are replaced by the halogen atoms, the crystal structure is strained. Accordingly, the Li ion conductivity of the sulfide-based solid electrolyte is inferred to increase.

It was confirmed that when the sulfide-based solid electrolyte does not contain the halogen element, both of the two peaks (the peak A and the peak B) are not observed in the $^{31}P$-MAS-NMR spectrum (not shown), and only one peak assigned to phosphorus atoms derived from $Li_3PO_4$ crystal, is observed therein.

Accordingly, in the case of the sulfide-based solid electrolyte not containing the halogen element, it seems difficult to form the LGPS-type crystal structure.

In the sulfide-based solid electrolyte of the disclosed embodiments, the ratio ($P_{4d}/P_{2b}$) between the proportion ($P_{4d}$) of the area of the peak assigned to the phosphorus atoms occupying the 4d sites in the crystal structure and the proportion ($P_{2b}$) of the area of the peak assigned to the phosphorus atoms occupying the 2b sites in the crystal structure, both of which are peaks observed by $^{31}P$-MAS-NMR, is 1.77 or more and 2.14 or less.

The peak assigned to the phosphorus atoms occupying the 4d sites in the crystal structure, is a peak in a chemical shift value range of from 85 ppm±0.5 ppm to 95 ppm±0.5 ppm in the spectrum obtained by $^{31}P$-MAS-NMR.

The peak assigned to the phosphorus atoms occupying the 2b sites in the crystal structure, is a peak in a chemical shift value range of from 70 ppm±0.5 ppm to 80 ppm±0.5 ppm in the spectrum obtained by $^{31}P$-MAS-NMR.

The conditions of $^{31}P$-MAS-NMR measurement are not particularly limited. The measurement can be carried out in conventionally-known measurement conditions.

The measurement conditions may be as follows, for example.

Device: INOVA300 (product name, manufactured by Agilent (formerly known as Varian))
Sample tube: $ZrO_2$ rotor (diameter 7 mm)
Rotational frequency: 7000 Hz
Standard: Phosphoric acid (controlled at 0 ppm)
Accumulated number: About 500
Gain: auto As the method for controlling the $P_{4d}/P_{2b}$ value of the sulfide-based solid electrolyte, examples include, but are not limited to, controlling a raw material composition amorphizing time in the production of the sulfide-based solid electrolyte, controlling the glass heating temperature, time, etc., producing the sulfide-based solid electrolyte in a sulfur-rich atmosphere, controlling the composition ratio of the halogen element in the sulfide-based solid electrolyte, changing the type of the halogen element contained in the sulfide-based solid electrolyte, (if different kinds of halogen elements are used in combination) changing the types of the combined halogen elements, and combining these methods.

The sulfide-based solid electrolyte is not particularly limited, as long as it contains the lithium (Li) element, the phosphorus (P) element, the sulfur (S) element and the halogen element, and it has the LGPS-type crystal structure.

A conventionally-known method can be used to determine whether the sulfide-based solid electrolyte has the LGPS-type crystal structure or not. For example, X-ray diffraction (XRD) measurement can be used.

As the sulfide-based solid electrolyte, examples include, but are not limited to, $LiX-Li_2S-P_2S_5$ and $LiX-Li_2O-Li_2S-P_2S_5$. The "$LiX-Li_2S-P_2S_5$" means a material composed of a raw material composition containing LiX, $Li_2S$ and $P_2S_5$, and the same applies to other solid electrolytes. Also, "X" in the "LiX" means a halogen element. The LiX contained in the raw material composition may be one or more kinds.

As the sulfide-based solid electrolyte, examples include, but are not limited to, $zLiX-(100-z)(0.75Li_2S-0.25P_2S_5)$ (where z is given in mol %; $0 < z < 100$; and X is halogen element).

As the sulfide-based solid electrolyte, examples also include, but are not limited to, 20LiI-80(0.75Li$_2$S.0.25P$_2$S$_5$), 10LiI-15LiBr-75(0.75Li$_2$S.0.25P$_2$S$_5$) and 10LiI-12LiBr-75 (0.75Li$_2$S.0.25P$_2$S$_5$). The raw material composition ratios of the exemplified sulfide-based solid electrolytes are molar ratios.

The sulfide-based solid electrolyte may be crystal or glass ceramic, as long as it has the LGPS-type crystal structure.

In the disclosed embodiments, "glass" means a material having a crystallinity of less than 20%; "glass ceramic" means a material having a crystallinity of 20% or more and less than 80%; and "crystal" means a material having a crystallinity of 80% or more.

The glass can be obtained by amorphizing a raw material composition (such as a mixture of LiX, Li$_2$S and P$_2$S$_5$).

The raw material composition can be amorphized by mechanical milling, for example. The mechanical milling may be dry mechanical milling or wet mechanical milling. The mechanical milling may be the latter, because attachment of the raw material composition to the inner surface of a container, etc., can be prevented.

When the raw material composition is amorphized by mechanical milling, the amorphizing conditions may be as follows:

plate rotational frequency: 510 rpm
amorphizing time: 20 to 40 minutes.

The glass ceramic can be obtained by heating a glass.

The crystal can be obtained by heating a glass or developing a solid state reaction of the raw material composition, for example.

The glass heating temperature may be 180° C. or more and 250° C. or less, for example.

The glass heating time may be from 1 to 5 hours, for example.

The crystallinity of the sulfide-based solid electrolyte may be 70% or more and 82% or less.

Since the crystallinity is 70% or more, the crystallinity of the sulfide-based solid electrolyte can be further ensured, and the lithium ion conductivity of the sulfide-based solid electrolyte can be increased.

Since the crystallinity is 82% or less, appearance of a diploid phase, which is due to collapse of the LGPS-type crystal structure of the sulfide-based solid electrolyte, can be suppressed, and the lithium ion conductivity of the sulfide-based solid electrolyte can be further increased. In addition, the production cost of the sulfide-based solid electrolyte can be reduced, since it is not necessary to increase the glass heating temperature.

The crystallinity can be a value obtained as follows. NMR measurement is carried out on the sulfide-based solid electrolyte. From an NMR spectrum thus obtained, the area of the peak assigned to the crystal and the total area of all peaks are measured. According to the following formula, the area of the peak assigned to the crystal is divided by the total area of all peaks, and the resulting value is multiplied by 100. Finally, the crystallinity is obtained.

Crystallinity (%)=(The area of a peak assigned to the crystal)/(The total area of all peaks)×100

From the viewpoint of handling, the form of the sulfide-based solid electrolyte may be a particulate form.

The sulfide-based solid electrolyte of the disclosed embodiments may be used as a material for an all-solid-state battery.

Figure 3:
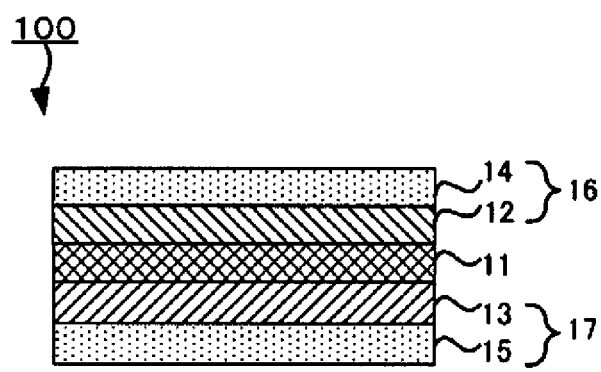
FIG. 3 is a schematic sectional view of an example of the all-solid-state battery of the disclosed embodiments.

FIG. 3 is a schematic sectional view of an example of the all-solid-state battery used in the disclosed embodiments.

As shown in FIG. 3, an all-solid-state battery 100 comprises a cathode 16 comprising a cathode layer 12 and a cathode current collector 14; an anode 17 comprising an anode layer 13 and an anode current collector 15; and a solid electrolyte layer 11 disposed between the cathode 16 and the anode 17.

The sulfide-based solid electrolyte of the disclosed embodiments may be used as a material for at least one layer selected from the group consisting of the cathode layer, anode layer and solid electrolyte layer of an all-solid-state battery, the solid electrolyte layer being disposed between the cathode layer and the anode layer. From the viewpoint of enhancing battery characteristics, the sulfide-based solid electrolyte of the disclosed embodiments may be used as a material for the solid electrolyte layer.

Materials used in the cathode, anode and solid electrolyte layer are not particularly limited, except that they may contain the sulfide-based solid electrolyte of the disclosed embodiments. As the materials, conventionally-known materials may be used.

As the all-solid-state battery, examples include, but are not limited to, a lithium battery in which a lithium metal deposition-dissolution reaction is used as an anode reaction, a lithium ion battery which is charged and discharged by lithium ion transfer between the cathode and the anode, a sodium battery, a magnesium battery and a calcium battery. The all-solid-state battery may be a lithium ion battery. Also, the all-solid-state battery may be a primary or secondary battery.

As the form of the all-solid-state battery, examples include, but are not limited to, a coin form, a laminate form, a cylindrical form and a square form.

EXAMPLES

Experiments on the production of sulfide-based solid electrolytes were carried out inside a glove box in which the atmosphere was controlled by Ar gas with a dew point of −70° C. or less.

Example 1

As starting materials, lithium sulfide (Li$_2$S), diphosphorus pentasulfide (P$_2$S$_5$), lithium iodide (LiI) and lithium bromide (LiBr) were used. The starting materials were weighed out to ensure that the composition of a sulfide-based solid electrolyte thus obtained was 10LiI-12LiBr-75 (0.75Li$_2$S.0.25P$_2$S$_5$) (mol %). The starting materials weighed out were mixed to obtain a mixture.

Then, 1 g of the mixture was put in a ZrO$_2$ container (45 ml). In addition, 500 ZrO$_2$ balls (diameter 4 mm) were put in the container. The container was hermetically closed, absolutely.

The container was installed in a planetary ball mill (product name: P-7, manufactured by: Fritsch) and subjected to mechanical milling at a plate rotational frequency of 510 rpm for 40 hours, thereby obtaining a glass powder.

The glass powder was vacuum-encapsulated in a quartz tube. The quarts tube was left to stand in a muffle furnace. The glass powder was heated to 200° C. for 15 minutes and then kept at 200° C. for 3 hours, thereby sintering the glass powder. Then, the glass powder was naturally cooled to room temperature in the furnace, thereby obtaining the sulfide-based solid electrolyte (10LiI-12LiBr-75 (0.75Li$_2$S.0.25P$_2$S$_5$)) of Example 1, which was in a powder form.

Li Ion Conductivity Measurement

The sulfide-based solid electrolyte powder thus obtained, was pressed to produce a pellet having an area of 1 cm² and a thickness of about 0.5 mm. AC impedance measurement was carried out on the pellet by use of an impedance analyzer (product name: VMP3, manufactured by: Biologic) to obtain the resistance value of the pellet at 100 kHz. The resistance value was corrected for the pellet thickness, thereby obtaining the Li ion conductivity of the sulfide-based solid electrolyte. The result is shown in Table 1.

$^{31}$P-MAS-NMR

On the sulfide-based solid electrolyte, the local structure analysis of the phosphorus element was carried out by $^{31}$P-MAS-NMR. From the analysis result, the $P_{4d}/P_{2b}$ value of the sulfide-based solid electrolyte was calculated. The result is shown in Table 1.

Crystallinity

The crystallinity of the sulfide-based solid electrolyte was measured. The result is shown in Table 1.

Example 2

The sulfide-based solid electrolyte (10LiI-12LiBr-75(0.75Li$_2$S.0.25P$_2$S$_5$)) of Example 2 was obtained in the same manner as Example 1, except that the glass powder was heated at a temperature of 220° C.

Example 3

The sulfide-based solid electrolyte (10LiI-12LiBr-75(0.75Li$_2$S.0.25P$_2$S$_5$)) of Example 3 was obtained in the same manner as Example 1, except that the glass powder was heated at a temperature of 240° C.

Example 4

The sulfide-based solid electrolyte (10LiI-12LiBr-75(0.75Li$_2$S.0.25P$_2$S$_5$)) of Example 4 was obtained in the same manner as Example 1, except that the glass powder was heated at a temperature of 180° C.

Comparative Example 1

As starting materials, lithium sulfide (Li$_2$S), diphosphorus pentasulfide (P$_2$S$_5$) and lithium iodide (LiI) were used.

The starting materials were weighed out to ensure that the composition of a sulfide-based solid electrolyte thus obtained was 20LiI-80(0.75Li$_2$S.0.25P$_2$S$_5$) (mol %). The starting materials weighed out were mixed to obtain a mixture.

Then, 1 g of the mixture was put in a ZrO$_2$ container (45 ml). In addition, 500 ZrO$_2$ balls (diameter 4 mm) were put in the container. The container was hermetically closed, absolutely.

The container was installed in the planetary ball mill (product name: P-7, manufactured by: Fritsch) and subjected to mechanical milling at a plate rotational frequency of 510 rpm for 20 hours, thereby obtaining a glass powder.

The glass powder was vacuum-encapsulated in a quartz tube. The quarts tube was left to stand in the muffle furnace. The glass powder was heated to 180° C. for 15 minutes and then kept at 180° C. for 3 hours, thereby sintering the glass powder. Then, the glass powder was naturally cooled to room temperature in the furnace, thereby obtaining the sulfide-based solid electrolyte (20LiI-80(0.75Li$_2$S.0.25P$_2$S$_5$)) of Comparative Example 1, which was in a powder form.

Comparative Example 2

As starting materials, lithium sulfide (Li$_2$S), diphosphorus pentasulfide (P$_2$S$_5$), lithium iodide (LiI) and lithium bromide (LiBr) were used. The starting materials were weighed out to ensure that the composition of a sulfide-based solid electrolyte thus obtained was 10LiI-15LiBr-75(0.75Li$_2$S.0.25P$_2$S$_5$) (mol %). The starting materials weighed out were mixed to obtain a mixture.

Then, 1 g of the mixture was put in a ZrO$_2$ container (45 ml). In addition, 500 ZrO$_2$ balls (diameter 4 mm) were put in the container. The container was hermetically closed, absolutely.

The container was installed in the planetary ball mill (product name: P-7, manufactured by: Fritsch) and subjected to mechanical milling at a plate rotational frequency of 510 rpm for 20 hours, thereby obtaining a glass powder.

The glass powder was vacuum-encapsulated in a quartz tube. The quarts tube was left to stand in the muffle furnace. The glass powder was heated to 250° C. for 15 minutes and then kept at 250° C. for 3 hours, thereby sintering the glass powder. Then, the glass powder was naturally cooled to room temperature in the furnace, thereby obtaining the sulfide-based solid electrolyte (10LiI-15LiBr-75(0.75Li$_2$S.0.25P$_2$S$_5$)) of Comparative Example 2, which was in a powder form.

Example 5

The sulfide-based solid electrolyte (10LiI-15LiBr-75(0.75Li$_2$S.0.25P$_2$S$_5$)) of Example 5 was obtained in the same manner as Comparative Example 2, except that the glass powder was heated at a temperature of 220° C.

TABLE 1

| | $P_{4d}/P_{2b}$ | Li ion conductivity (mS/cm) | Crystallinity (%) |
|---|---|---|---|
| Comparative Example 1 | 2.24 | 2.71 | 77 |
| Comparative Example 2 | 2.43 | 3.00 | 91 |
| Example 1 | 1.77 | 4.21 | 79 |
| Example 2 | 1.99 | 4.62 | 70 |
| Example 3 | 2.08 | 4.41 | 82 |
| Example 4 | 2.14 | 3.68 | 81 |
| Example 5 | 2.05 | 4.36 | 81 |

As shown in Table 1, the sulfide-based solid electrolytes of Examples 1 to 5, for each of which the $P_{4d}/P_{2b}$ value is in a range of 1.77 or more and 2.14 or less, have higher Li ion conductivity than the sulfide-based solid electrolytes of Comparative Examples 1 and 2, for each of which the $P_{4d}/P_{2b}$ value is outside a range of 1.77 or more and 2.14 or less.

Accordingly, it was proved that the Li ion conductivity of the sulfide-based solid electrolyte is increased by setting the $P_{4d}/P_{2b}$ value in a range of 1.77 or more and 2.14 or less.

Figure 2:
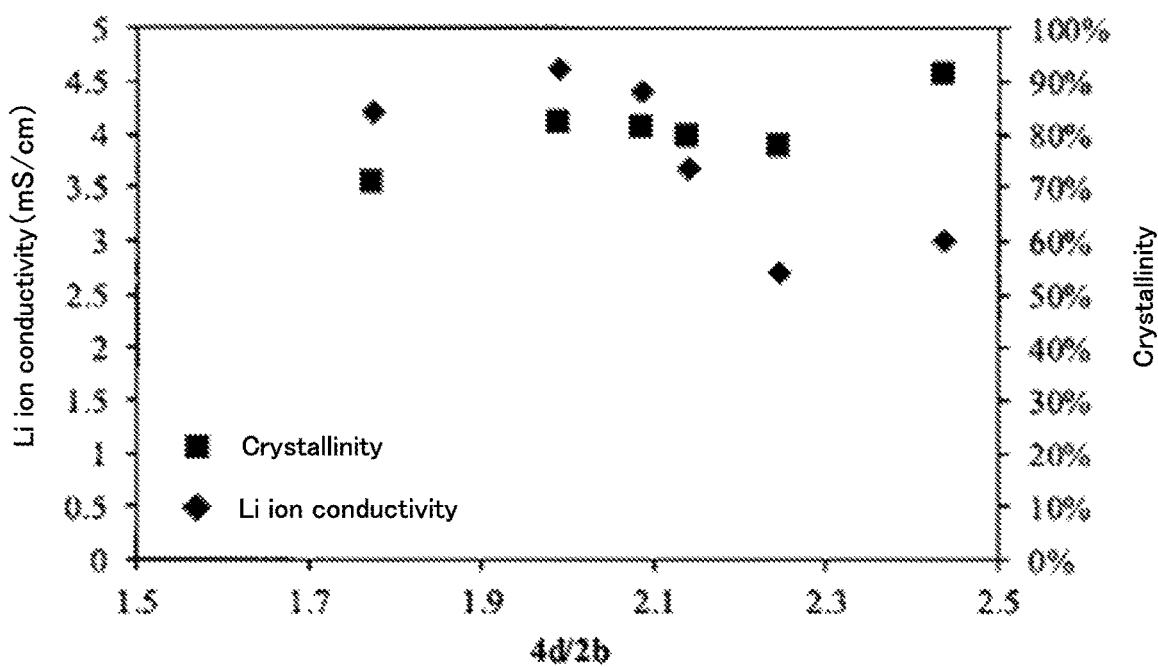
FIG. 2 is a view showing a relationship between (1) the ratio ($P_{4d}/P_{2b}$) between the proportion ($P_{4d}$) of the area of a peak assigned to phosphorus atoms occupying 4d sites in the crystal structure of the sulfide-based solid electrolyte and the proportion ($P_{2b}$) of the area of a peak assigned to phosphorus atoms occupying 2b sites in the crystal structure thereof, (2) the crystallinity of the sulfide-based solid electrolyte, and (3) the Li ion conductivity of the sulfide-based solid electrolyte.

FIG. 2 is a view showing a relationship between (1) the ratio ($P_{4d}/P_{2b}$) between the proportion ($P_{4d}$) of the area of a peak assigned to phosphorus atoms occupying 4d sites in the crystal structure of the sulfide-based solid electrolyte and the proportion ($P_{2b}$) of the area of a peak assigned to phosphorus atoms occupying 2b sites in the crystal structure thereof, (2)

the crystallinity of the sulfide-based solid electrolyte, and (3) the Li ion conductivity of the sulfide-based solid electrolyte As shown in Table 1, the crystallinity of the sulfide-based solid electrolytes of Examples 1 to 5 is from 70% to 82%, and the crystallinity of the sulfide-based solid electrolytes of Comparative Examples 1 and 2 is from 77% to 91%.

Accordingly, the range of the crystallinity of the sulfide-based solid electrolytes of Examples 1 to 5 partly overlaps with the range of the crystallinity of the sulfide-based solid electrolytes of Comparative Examples 1 and 2.

Accordingly, it was revealed that as long as the $P_{4d}/P_{2b}$ value of the sulfide-based solid electrolyte is in a range of 1.77 or more and 2.14 or less, irrespective of the crystallinity, the Li ion conductivity of the sulfide-based solid electrolyte is high.

The crystallinity of the sulfide-based solid electrolytes of Examples 1 to 5 is lower than the sulfide-based solid electrolyte of Comparative Example 2; however, the Li ion conductivity of the sulfide-based solid electrolytes of Examples 1 to 5 is higher. Accordingly, the Li ion conductivity of the sulfide-based solid electrolyte is increased without an excessive increase in the crystallinity of the sulfide-based solid electrolyte. In addition, since it is not needed to excessively increase the crystallinity, it is thought that appearance of a diploid phase, which is due to collapse of the LGPS-type crystal structure of the sulfide-based solid electrolyte, is suppressed, and the Li ion conductivity is further increased.

The low Li ion conductivity of the sulfide-based solid electrolytes of Comparative Examples 1 and 2 is inferred to be because the LGPS-type crystal structure of the sulfide-based solid electrolytes each obtained by sintering the glass powder, collapsed and a diploid phase appeared.

The Li ion conductivity of the sulfide-based solid electrolyte for which the $P_{4d}/P_{2b}$ value is in a range of 1.77 or more and 2.14 or less, is increased higher than the sulfide-based solid electrolyte for which the $P_{4d}/P_{2b}$ value is outside the range. The mechanism for this is unclear. However, it is inferred that since the $PS_4$ tetrahedra in the crystal structure were replaced by halogen atoms, the crystal structure of the sulfide-based solid electrolyte was strained and, as a result, the Li ion conductivity was increased.

REFERENCE SIGNS LIST

11. Solid electrolyte layer
12. Cathode layer
13. Anode layer
14. Cathode current collector
15. Anode current collector
16. Cathode
17. Anode
100. All-solid-state battery

The invention claimed is:

1. A sulfide-based solid electrolyte, wherein the sulfide-based solid electrolyte comprises a lithium (Li) element, a phosphorus (P) element, a sulfur (S) element, a bromine (Br) element and an iodine (I) element, and it has a LGPS-type crystal structure, and wherein a ratio ($P_{4d}/P_{2b}$) between a proportion ($P_{4d}$) of an area of a peak assigned to phosphorus atoms occupying 4d sites in the crystal structure and a proportion ($P_{2b}$) of an area of a peak assigned to phosphorus atoms occupying 2b sites in the crystal structure, both of which are peaks observed in a $^{31}$P-MAS-NMR spectrum of the sulfide-based solid electrolyte, is 1.77 or more and 2.14 or less.

2. The sulfide-based solid electrolyte according to claim 1, wherein a crystallinity of the sulfide-based solid electrolyte is 70% or more and 82% or less.

3. The sulfide-based solid electrolyte according to claim 1, wherein the sulfide-based solid electrolyte is 10LiI-15LiBr-75(0.75Li$_2$S.0.25P$_2$S$_5$) or 10LiI-12LiBr-75(0.75Li$_2$S.0.25P$_2$S$_5$).

* * * * *